US012594594B2

(12) United States Patent
DeCarlo et al.

(10) Patent No.: US 12,594,594 B2
(45) Date of Patent: Apr. 7, 2026

(54) HYBRID SETTER FOR INVESTMENT CASTING CORES AND METHOD OF USING

(71) Applicant: Blasch Precision Ceramics, Inc., Albany, NY (US)

(72) Inventors: Keith Joseph DeCarlo, North Greenbush, NY (US); Liam Gabriel Saccucci-Bryan, Schenectady, NY (US); Pierre Francois Pinard, Voorheesville, NY (US); Rehan Afzal, Latham, NY (US)

( * ) Notice: Subject to any disclaimer, the term of this patent is extended or adjusted under 35 U.S.C. 154(b) by 32 days.

(21) Appl. No.: 18/470,492

(22) Filed: Sep. 20, 2023

(65) Prior Publication Data

US 2024/0100589 A1 Mar. 28, 2024

Related U.S. Application Data

(60) Provisional application No. 63/376,636, filed on Sep. 22, 2022.

(51) Int. Cl.

| | |
|---|---|
| ***B22C 9/04*** | (2006.01) |
| ***B22C 9/10*** | (2006.01) |
| ***B22C 13/12*** | (2006.01) |
| ***B28B 11/24*** | (2006.01) |
| ***F27D 5/00*** | (2006.01) |

(52) U.S. Cl.

CPC .................. *B22C 9/04* (2013.01); *B22C 9/10* (2013.01); *B22C 13/12* (2013.01); *B28B 11/243* (2013.01); *F27D 5/0012* (2013.01); *F27D 5/0031* (2013.01)

(58) Field of Classification Search

CPC .. B22C 9/04; B22C 9/10; B22C 13/12; B28B 11/243; F27D 5/0012; F27D 5/0031

See application file for complete search history.

(56) References Cited

U.S. PATENT DOCUMENTS

| | | | |
|---|---|---|---|
| 6,142,774 | A | 11/2000 | Brands et al. |
| 6,347,660 | B1 | 2/2002 | Sikkenga et al. |
| 6,533,986 | B1 | 3/2003 | Fosaaen et al. |
| 10,179,362 | B2 | 1/2019 | Slavens et al. |
| 10,821,678 | B2 | 11/2020 | Schmidt et al. |
| 11,014,140 | B2 | 5/2021 | Banks et al. |
| 2004/0159985 | A1 | 8/2004 | Altoonian et al. |

(Continued)

FOREIGN PATENT DOCUMENTS

| | | | |
|---|---|---|---|
| DE | 2461297 A1 | 7/1976 | |
| DE | 10312802 B3 * | 7/2004 | ........... C21D 9/0025 |

(Continued)

OTHER PUBLICATIONS

DE-10312802-B3 translation (Year: 2004).*

(Continued)

*Primary Examiner* — Steven S Anderson, II
*Assistant Examiner* — Kurt J Wolford
(74) *Attorney, Agent, or Firm* — Hoffman Warnick LLC

(57) ABSTRACT

A setter for an investment casting core is provided. The setter may include: a base section; and a cover section configured to mechanically couple to the base section and having a profile for receiving the investment casting thereon. A setter array for a plurality of investment casting cores is further provided. A method for supporting an investment casting core during heat treatment using the setter is also provided.

14 Claims, 22 Drawing Sheets

(56) References Cited

U.S. PATENT DOCUMENTS

| | | | |
|---|---|---|---|
| 2020/0172445 A1 | 6/2020 | Jo et al. | |
| 2020/0324333 A1* | 10/2020 | Banks | B22C 9/10 |

FOREIGN PATENT DOCUMENTS

| | | | |
|---|---|---|---|
| DE | 202009015250 U1 | 4/2010 |
| EP | 2631583 A1 | 8/2013 |
| EP | 3425317 A1 | 1/2019 |
| JP | 2007246385 A | 9/2007 |
| KR | 20160043201 A | 4/2016 |
| WO | 2015008503 A1 | 1/2015 |
| WO | 2021033375 A1 | 2/2021 |

OTHER PUBLICATIONS

Oak_Ridge_National_Laboratory_Thermophysical_and_Mechanical_Properites_of_SiCSiC_Composities.pdf (Year: 1998).*

Precision_Ceramics_Maximum_Temperature.pdf (Year: 2022).*

Star_Rapid_Porosity_in_Pressure_Die_Casting_and_How_To_Control_It.pdf (Year: 2020).*

LL Special Furnace Firing advanced ceramics in high temperature furnaces (Year: 2015).*

International Preliminary Report on Patentability and Written Opinion dated Mar. 1, 2025 for PCT/US2023/033236 filed Sep. 20, 2023; pp. 14.

* cited by examiner

HYBRID SETTER FOR INVESTMENT CASTING CORES AND METHOD OF USING

CROSS-REFERENCES TO RELATED APPLICATIONS

This application claims the benefit of priority from U.S. provisional patent application No. 63/376,636, filed on Sep. 22, 2022, the content of which is hereby expressly incorporated by reference into this disclosure as if set forth in its entirety herein.

BACKGROUND

The disclosure relates generally to a setter for an investment casting core, a setter array, a setter system, and a method of using the same. In particular, the disclosure relates generally to a hybrid setter, a setter array, and a setter system for heat treatment of an investment casting core and a method of supporting an investment casting core during heat treatment using the same.

Often, due to complex geometry of an investment casting core, such as a ceramic core, a setter with a complimentary profile is usually used in an effort to minimize any distortion that may occur during the heat treatment of the investment casting core. Similar to the investment casting cores themselves, the corresponding setters may also require very tight geometrical tolerances. There may be thousands of different core designs and each different core may require a different setter which, subsequently, requires a different mold for each different setter. Furthermore, because of the tight geometrical tolerances of the cores and setters, if a different material is used for the core or setter, a different mold needs to be used to account for different shrinkage profiles of the materials during the heat treatment process. This leads to an extensive inventory of molds and a long lead time, especially if a new mold is needed for a customized investment casting core.

BRIEF DESCRIPTION

Certain embodiments are summarized below. These embodiments are not intended to limit the scope of the present disclosure, but rather these embodiments are intended only to provide a brief summary of possible forms of the disclosure. Indeed, the present system and method may encompass a variety of forms that may be similar to or different from the embodiments set forth below.

All aspects, examples and features mentioned below can be combined in any technically possible way.

An aspect of the disclosure provides a setter for an investment casting core, the setter including: a base section; and a cover section configured to mechanically couple to the base section and having a profile for receiving the investment casting core thereon.

Another aspect of the disclosure a setter array for a plurality of investment casting cores, the setter array including: a base section, and a plurality of cover sections each configured to mechanically couple to a respective portion of the base section and having a profile for receiving a respective one of the plurality of investment casting cores thereon.

Yet another aspect of the disclosure provides a method for supporting an investment casting core during heat treatment using a setter, the method including: providing a base section; mechanically coupling a cover section to the base section, the cover section including a profile for receiving the investment casting core thereon; positioning the investment casting core on the cover section such that a surface of the investment casting core substantially mates with a portion of the profile of the cover section that receives the investment casting core thereon.

The details of one or more implementations are set forth in the accompanying drawings and the description below. Other features, objects and advantages will be apparent from the description and drawings, and from the claims.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

Figure 1B:
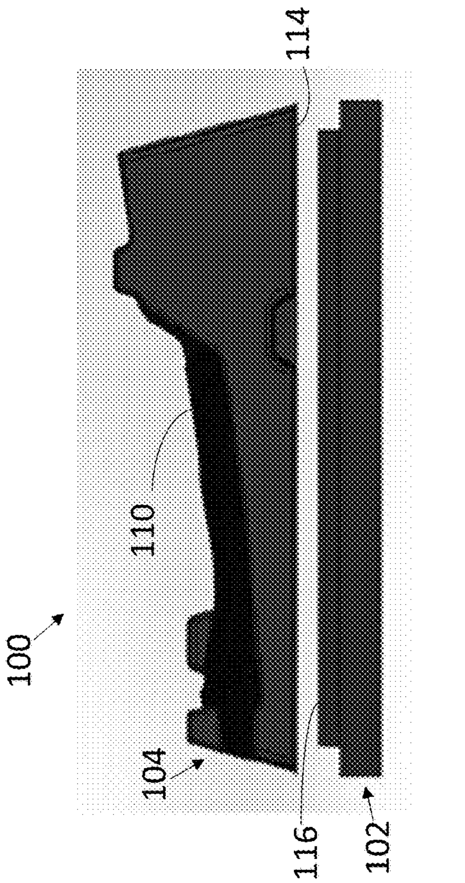
FIG. 1B is an exploded perspective side view of the setter of FIG. 1A, according to embodiments of the disclosure.

It is noted that the drawings of the disclosure are not necessarily to scale. The drawings are intended to depict only typical aspects of the disclosure and therefore should not be considered as limiting the scope of the disclosure. In the drawings, like numbering represents like elements between the drawings.

DETAILED DESCRIPTION

Certain embodiments will now be described to provide an overall understanding of the principles of the structure, function, manufacture, and use of the methods, systems, and devices disclosed herein. One or more examples of these embodiments are illustrated in accompanying drawings. Those skilled in the art will understand that methods, systems, and devices specifically described herein and illustrated in the accompanying drawings are non-limiting embodiments. Features illustrated or described in connection with one embodiment may be combined with features of other embodiments. Such modifications and variations are intended to be included within the scope of the present disclosure.

As an initial matter, in order to clearly describe the subject matter of the current disclosure, it will become necessary to select certain terminology when referring to and describing relevant machine components. To the extent possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, as described below. The terms "first", "second", and "third" may be used interchangeably to distinguish one component from another and are not intended to signify location or importance of the individual components.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components but do not preclude the presence or addition of one or more other features, integers, steps, operations, elements, components, and/or groups thereof. "Optional" or "optionally" means that the subsequently described event or circumstance may or may not occur or that the subsequently describe component or element may or may not be present, and that the description includes instances where the event occurs or the component is present and instances where it does not or is not present.

Where an element or layer is referred to as being "on," "engaged to," "connected to" or "coupled to" another element or layer, it may be directly on, engaged to, connected to, or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

As indicated above, the disclosure provides a setter for an investment casting core, a setter array, a setter system, and a method of using the same. In particular, the disclosure relates generally to a setter, a setter array, and a setter system for heat treatment of an investment casting core and a method of supporting an investment casting core during heat treatment using a setter, a setter array, or a setter system.

As described earlier, in the field of investment casting, a setter or setter system with a complimentary profile to an investment casting core is usually used in an effort to minimize any distortion that may occur during the heat treatment of the investment casting core. In many situations, investment casting cores are customized with very tight geometrical tolerances. Therefore, similar to the investment casting core it supports, the corresponding setter or setter system also require very tight geometrical tolerances. This leads to challenges including, but not limited to, an extensive inventory of setters for investment casting cores with different profiles and a long lead time in manufacturing the setters, especially if a new setter is needed for a customized investment casting core. The current disclosure is developed to solve the challenges by providing a hybrid setter that includes, for example, a base section and a cover section configured to mechanically couple to the base section. The cover section may include a profile for receiving an investment casting core thereon. The base section and the cover section may include different materials and may be manufactured by different processes. The hybrid setters of the current disclosure and the methods of making the same provide advantages over conventional setters and methods in minimizing the burdens of an extensive inventory of setters and a long lead time, while meeting the demands for customizable, tight geometrical tolerances for use in investment casting.

Figure 1A:
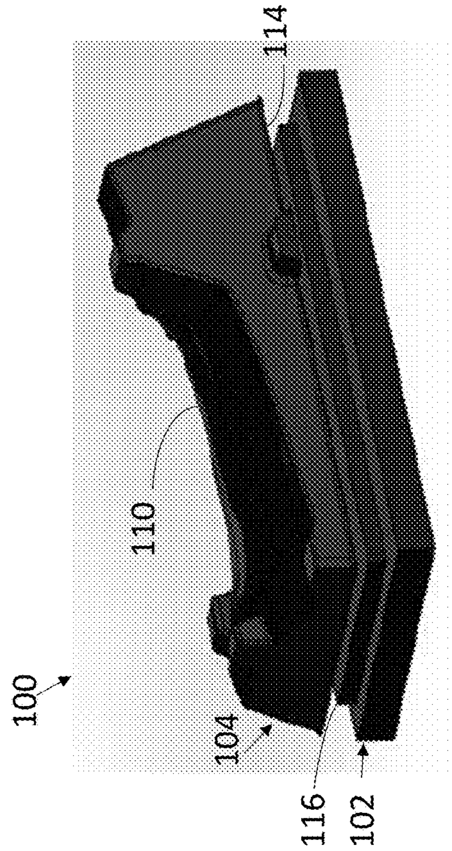
FIG. 1A is an exploded perspective view of a setter, according to embodiments of the disclosure.

Referring to FIG. 1A, an exploded perspective view of a setter 100 is provided. FIG. 1B is an exploded side view of setter 100. Setter 100 includes a base section 102 and a cover section 104 configured to mechanically couple to base section 102, as described in more detail later. In embodiments, cover section 104 is configured to mechanically couple to base section 102 without the use of a mortar. In some embodiments, cover section 104 is configured to mechanically couple to base section 102 with an additional use of a mortar. The cover section 104 includes a profile for receiving investment casting core 108 (FIG. 1C) thereon.

In some embodiments, base section 102 and cover section 104 of setter 100 may include the same material. In certain embodiments, setter 100 is a hybrid setter including two materials that may be different. Base section 102 may include a first material, and cover section 104 may include a second material different from the first material. In embodiments, the second material may be the same material as the material for investment casting core 108 disposed on cover section 104. Matching the second material with the material of the investment casting core provides the benefits of minimizing any distortion that may occur during the heat treatment of the investment casting core.

In embodiments, the first material may include a ceramic material including but not limited to: cordierite, fireclay, ball clay, tile clay, flint clay, or any combinations thereof. The second material may include a ceramic material including but not limited to: alumina, mullite, silica, or zirconia, or any combinations thereof. The first and second materials may be selected such that setter 100 withstands a temperature range of 1500° F. to 2500° F. during heat treatment of investment casting core 108.

In embodiments, the first material is configured to have a first porosity in a range of about 5-45 vol %, or in a range of about 10-40 vol %, or in a range of about 15-35 vol %, or in a range of about 10-35 vol %, or in a range of about 10-25 vol %, based on a total volume of base section 102. The second material is configured to have a second porosity in a range of about 1-5 vol %, or in a range of about 2-4 vol %, based on a total volume of cover section 104. The first porosity and the second porosity may be measured by using a calibrated scale and following ASTM (American Society for Testing and Material) standards, for example, ASTM standard test methods for apparent porosity. The first porosity and second porosity are configured to provide thermal stability to setters, setter arrays, or setter systems of the instant disclosure.

Figure 1C:
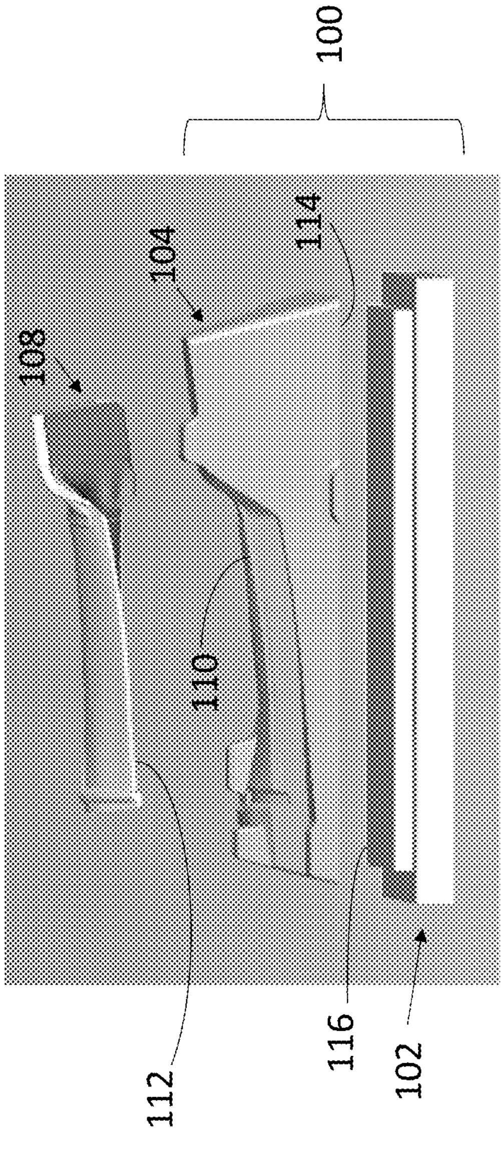
FIG. 1C is an exploded side view of the setter of FIG. 1A with an investment casting core disposed thereon.

FIG. 1C is an exploded side view of setter 100 with investment casting core 108 disposed thereon. In embodiments, cover section 104 includes an upper profile 110 that substantially mates with an undersurface 112 of investment casting core 108 received on cover section 104.

In some embodiments, the profile of cover section 104 further includes a lower profile 114 that substantially mates with an upper profile 116 of base section 102.

It is to be understood that the setter illustrated in FIGS. 1A-1C and described herein is intended to be a generic representation of embodiments of various setters disclosed in the current disclosure and is not limited to the specific configurations, sizes, and shapes as shown. The aspects, and features described with respect to FIGS. 1A-1C can be applied and/or combined with features in other embodiments described throughout the disclosure. For example, the descriptions with respect to FIGS. 1A-1C, including features of the base and cover sections, and features of matching upper profile of the cover section and undersurface of investment casting core, etc., can be applied in setters, setter arrays, and setter systems having various sizes/shapes/configurations as disclosed in embodiments throughout the current disclosure.

Figure 2A:
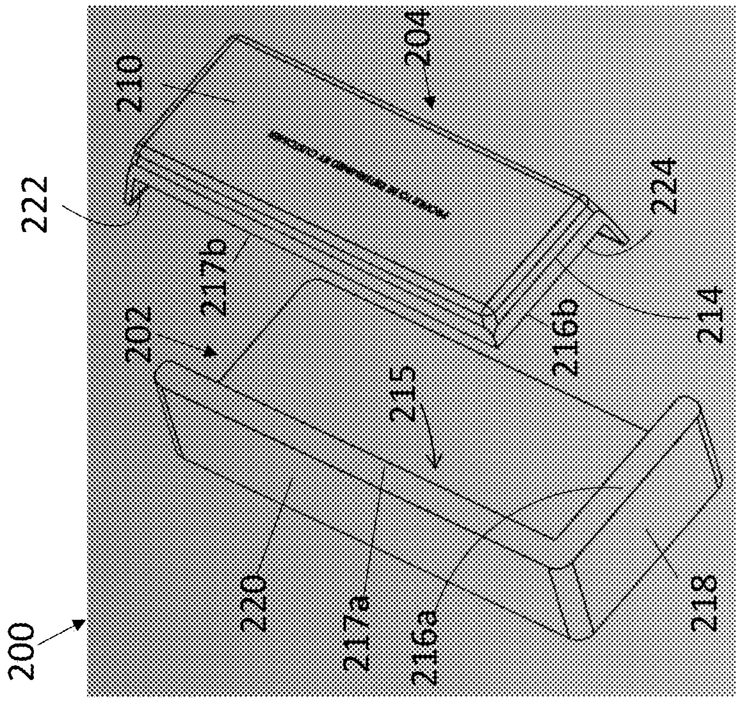
FIG. 2A is an exploded perspective view of a setter including two sidewall extensions, according to embodiments of the disclosure.

Referring to FIG. 2A, an exploded perspective view of a setter 200 is presented. Setter 200 includes a base section 202 and a cover section 204 configured to mechanically couple to base section 202. The cover section 204 includes a profile for receiving an investment casting core (not shown) thereon. In embodiments, the profile of the cover section 204 includes an upper profile 210 that substantially mates with an undersurface of investment casting core received thereon. It is to be understood that the configuration of upper profile 210 as illustrated herein and in other figures (with similar reference numerals such as 310, 410, etc.) throughout the current disclosure is a non-limiting example. Upper profile 210 may be in other shapes or configurations. For example, similar to embodiments illustrated in FIG. 1C, upper profile 210 of cover section 204 may have a customized size and shape such that upper profile 210 would substantially mate with a portion, for example, an undersurface portion of investment casting core received thereon. In certain embodiments, the cover section may be 3D printed to provide a customized shape or configuration such that the upper profile would substantially mate with an undersurface of investment casting core received thereon.

Figure 2B:
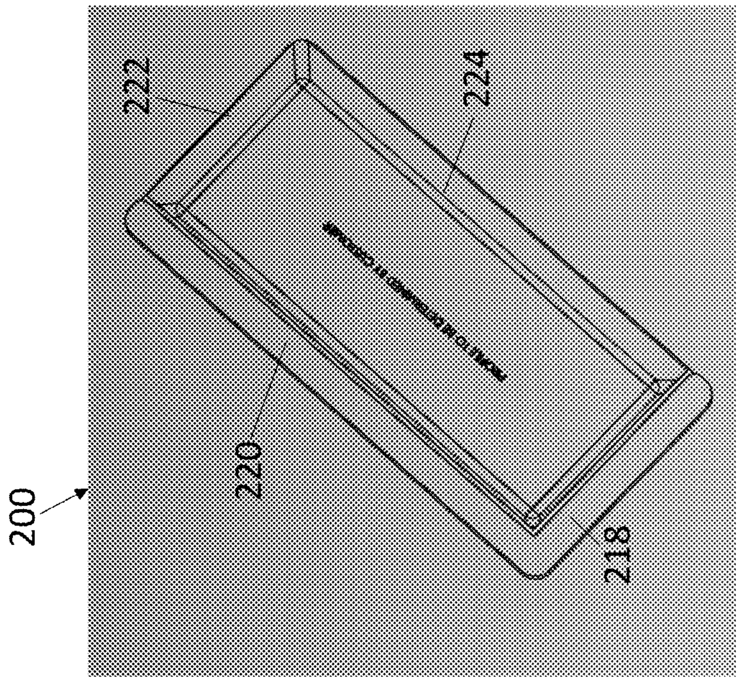
FIG. 2B is a top view of the setter of FIG. 2A, according to embodiments of the disclosure.

With further reference to FIG. 2A, the profile of the cover section 204 further includes a lower profile 214 that substantially mates with an upper profile 215 of base section 202. In the embodiments, lower profile 214 of cover section 204 may include a first sidewall extension 222 and a second sidewall extension 224 extending towards base section 202 (for example, extending outwardly and downwardly from cover section 204 towards base section 202), where second sidewall extension 224 abuts first sidewall extension 222. In embodiments, first and second sidewall extensions 222, 224 may form a substantially right angle (i.e. 90 degrees). The upper profile 215 of base section 202 may include a third sidewall extension 218 and a fourth sidewall extension 220 extending towards cover section 204 (for example, extending outwardly and upwardly from a bottom surface of base section 202 towards cover section 204), where third sidewall extension 218 and fourth sidewall extension 220 are opposite and having complimentary profile to first sidewall extension 222 and second sidewall extension 224, respectively. Therefore, when cover section 204 is received or assembled into base section 202, as illustrated in FIG. 2B, sidewall extensions 218, 220, 222, 224 collectively form a peripheral surface of setter 200. As further illustrated in FIG. 2B, an inner surface 216*a* of first sidewall extensions 218 and an inner surface 217*a* of second sidewall extension 220 abuts a first portion 216*b* and a second portion 217*b* of cover section 204, respectively.

Figure 3A:
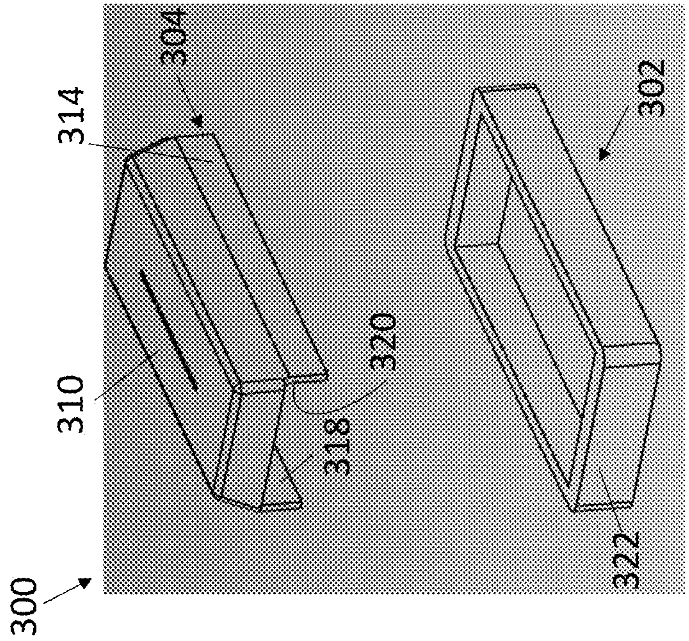
FIG. 3A is an exploded perspective view of a setter including full sidewall extensions, according to embodiments of the disclosure.
Figure 3B:
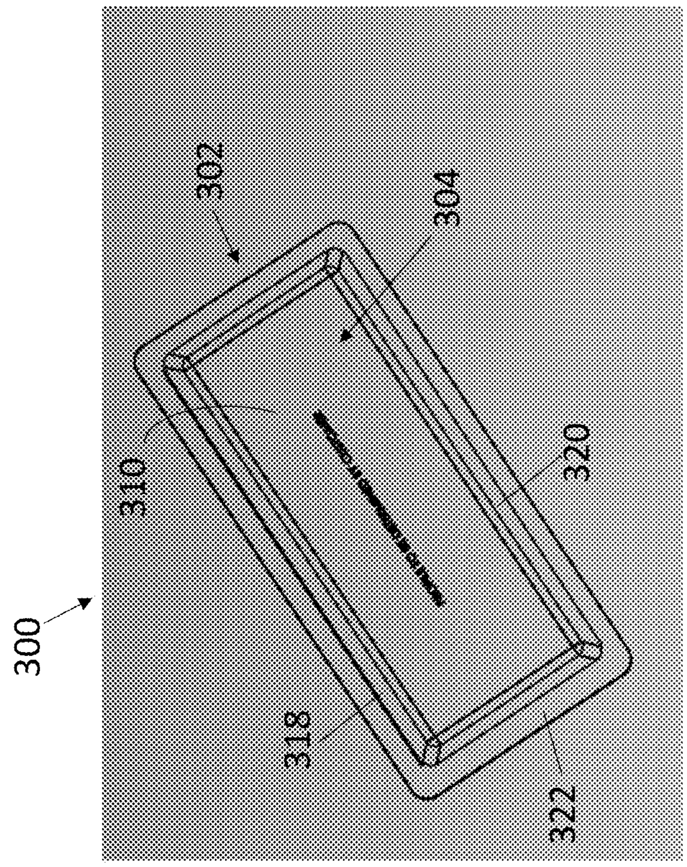
FIG. 3B is a top view of the setter of FIG. 3A, showing the cover section received in the base section, according to embodiments of the disclosure.

Referring to FIG. 3A, an exploded perspective view of a setter 300 is presented. Setter 300 includes a base section 302 and a cover section 304 configured to mechanically couple to base section 302. The cover section 304 includes a profile for receiving an investment casting core (not shown) thereon. In embodiments, the profile of the cover section 304 includes an upper profile 310 that substantially mates with a portion, for example, an undersurface of the investment casting core received thereon, and a lower profile that substantially mates with an upper profile of base section 302. In the embodiments, lower profile of cover section 304 may include a first sidewall extension 318 and a second sidewall extension 320 extending (for example, extending outwardly and downwardly) towards base section 302, where second sidewall extension 320 are opposite to first sidewall extension 318. The upper profile of base section 302 may include peripheral sidewall extensions 322 extending (for example, extending outwardly and upwardly) from a bottom surface of base section 302 towards cover section 304 and defining a peripheral boundary of base section 302. The peripheral sidewall extensions 322 is sized and shaped to receive and enclose first and second sidewall extensions 318, 320 therein. As illustrated in FIG. 3B, when cover section 304 is received or assembled into base section 302, an external surface of each of first and second sidewall extensions 318, 320 abuts an inner surface of a first portion and a second portion of peripheral sidewall extensions 322, respectively.

Figure 4B:
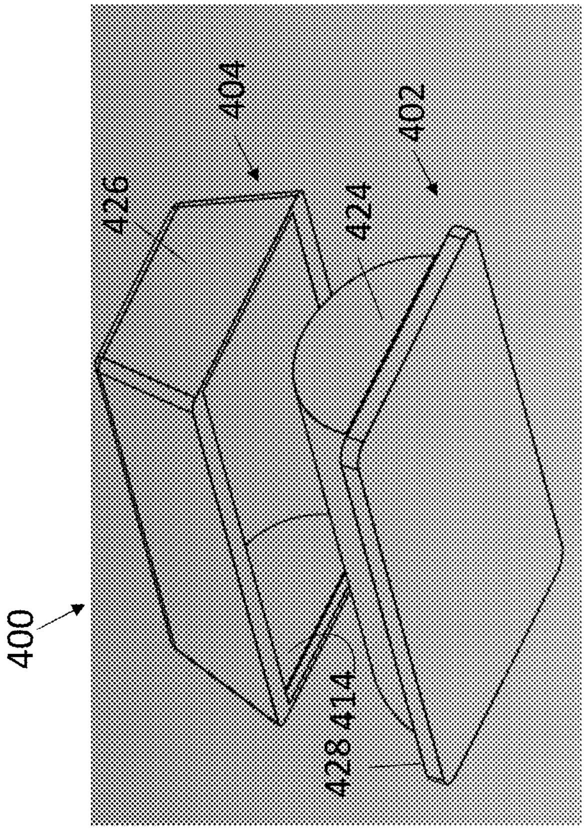
FIG. 4B is another exploded perspective view of the setter of FIG. 4A, according to embodiments of the disclosure.
Figure 4A:
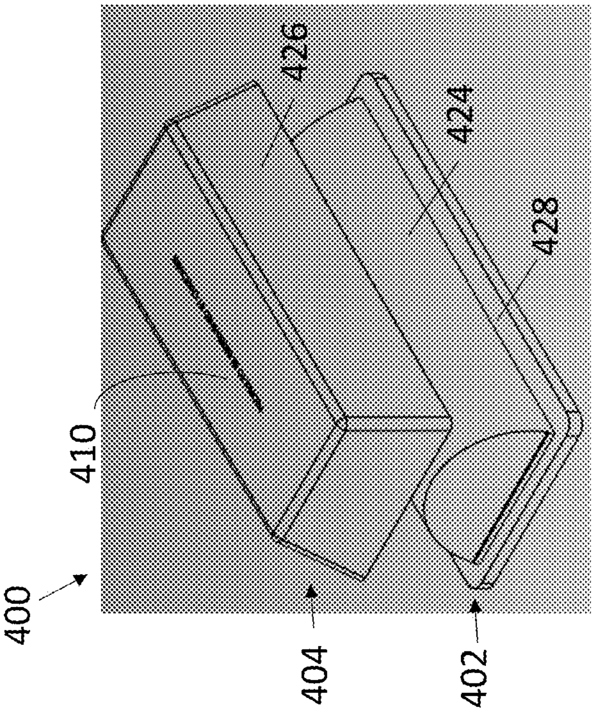
FIG. 4A is an exploded perspective view of a setter that includes a base section including a semicylindrical portion, according to embodiments of the disclosure.

FIG. 4A is an exploded perspective view of a setter 400. Setter 400 includes a base section 402 and a cover section 404 configured to mechanically couple to base section 402. In embodiments, cover section 404 includes a profile for receiving an investment casting core (not shown) thereon. The profile of the cover section 404 may include an upper profile 410 that substantially mates with a portion, for example, an undersurface of the investment casting core received thereon, and a lower profile that substantially mates with an upper profile of base section 402. In the embodiments, upper profile of base section 402 may include a semicylindrical portion 424 extending (for example, extending outwardly and upwardly) from a bottom surface of base section 402 towards cover section 404.

Figure 4C:
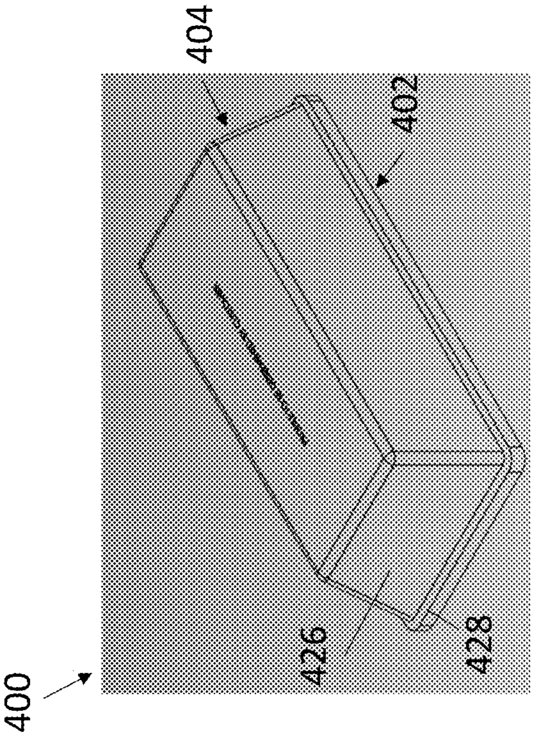
FIG. 4C is a perspective view of the setter of FIG. 4A, showing the cover section received in the base section, according to embodiments of the disclosure.

As illustrated in FIG. 4B, in certain embodiments, inner surface of cover section 404 includes at least a portion with a matching profile to semicylindrical portion 424. The semicylindrical portion 424 is configured such that at least a portion of semicylindrical portion 424 abuts at least a portion of the inner surface 414 of cover section 404 when cover section 404 is received in base section 402 (FIG. 4C). Lower profile of cover section 404 may include a peripheral sidewall 426, and at least a portion of an external surface of semicylindrical portion 424 abuts at least a portion of an inner surface of peripheral sidewall 426.

Base section 402 may further include a lip 428 surrounding semicylindrical portion 424. In FIG. 4C, a top perspective view of setter 400 is provided, showing cover section 404 received in base section 402, where a peripheral edge of cover section 404 is positioned on and abuts lip 428.

Figure 5B:
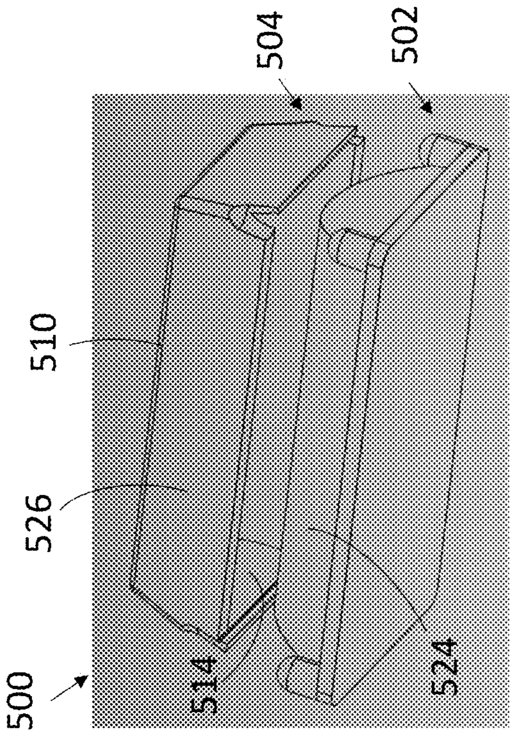
FIG. 5B is another exploded perspective view of the setter of FIG. 5A, according to embodiments of the disclosure.
Figure 5A:
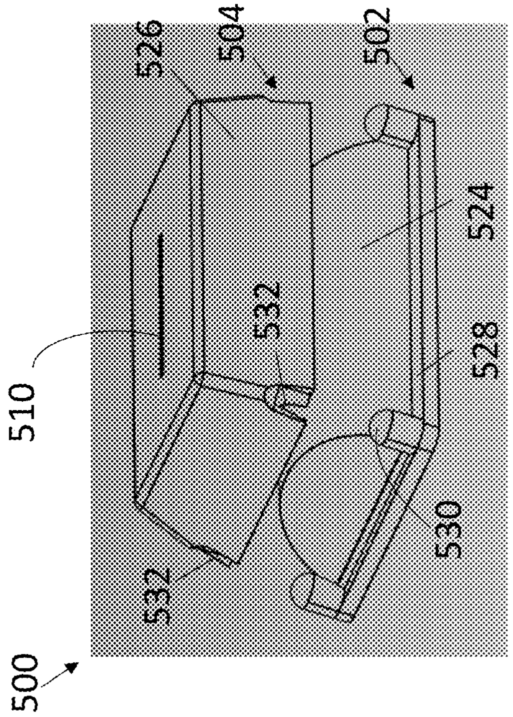
FIG. 5A is an exploded perspective view of a setter that includes: a base section including a semicylindrical portion and a projection, and a cover section including a recess, according to embodiments of the disclosure.

FIG. 5A is an exploded perspective view of a setter 500. Setter 500 includes a base section 502 and a cover section 504 configured to mechanically couple to base section 502. In embodiments, cover section 504 includes a profile for receiving an investment casting core (not shown) thereon. The profile of cover section 504 may include an upper profile 510 that substantially mates with a portion, for example, an undersurface of the investment casting core received thereon, and a lower profile that substantially mates with an upper profile of base section 502. In the embodiments, upper profile of base section 502 may include a semicylindrical portion 524 extending (for example, extending outwardly and upwardly) from a bottom surface of base section 502 towards cover section 504.

Figure 5C:
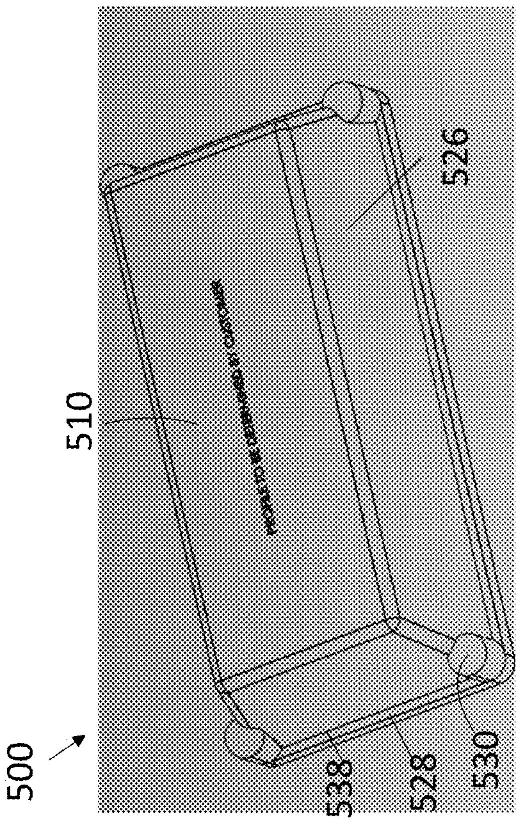
FIG. 5C is a perspective view of the setter of FIG. 5A, showing the cover section received in the base section, according to embodiments of the disclosure.

As illustrated in FIG. 5B, in certain embodiments, inner surface 514 of cover section 504 includes at least a portion with a matching profile to semicylindrical portion 524. The semicylindrical portion 524 is configured such that at least a portion of semicylindrical portion 524 abuts at least a portion of inner surface 514 of cover section 504 when cover section 504 is received in base section 502 (FIG. 5C). Lower profile of cover section 504 may include a peripheral wall 526, and at least a portion of an external surface of semicylindrical portion 524 abuts at least a portion of an inner surface of peripheral wall 526.

The base section 502 may further include a lip 528 surrounding semicylindrical portion 524 and a projection 530 disposed on lip 528 and extending upward therefrom. In some embodiments, projection 530 may have a cylindrical profile. The lower profile of cover section 504 may further include a recess 532 sized and shaped to receive at least a portion of projection 530.

In FIG. 5C, a top perspective view of setter 500 is provided, showing cover section 504 received in base section 502, where a peripheral edge 538 of cover section 504 is positioned on and abuts lip 528, and at least a portion of projection 530 is received within recess 532 and abuts a portion of peripheral wall 526.

Figure 6B:
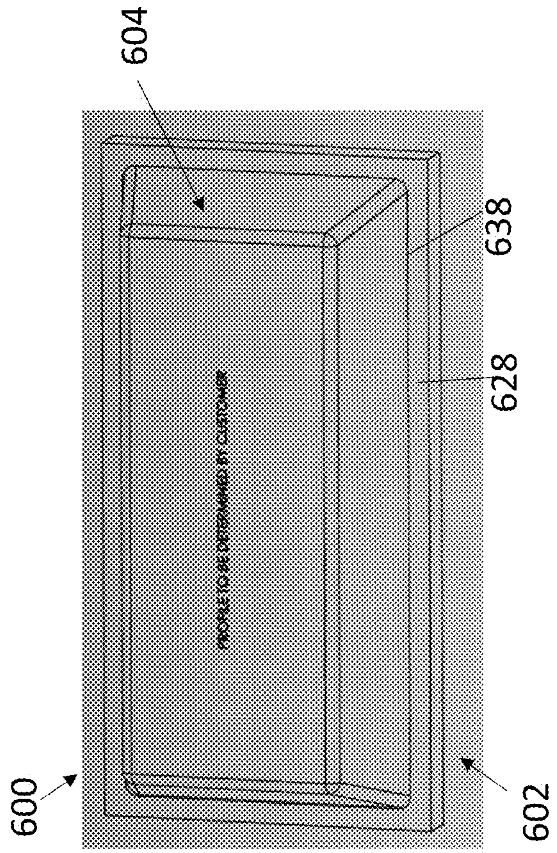
FIG. 6B is a top perspective view of the setter of FIG. 6A, according to embodiments of the disclosure.
Figure 6A:
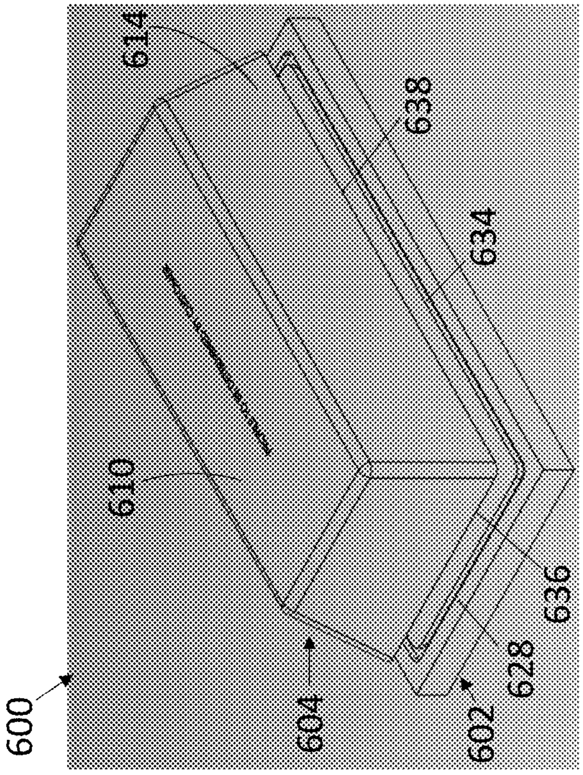
FIG. 6A is an exploded perspective view of a setter that includes a base section including a peripheral groove, according to embodiments of the disclosure.

FIG. 6A is an exploded perspective view of a setter 600. Setter 600 includes a base section 602 and a cover section 604 configured to mechanically couple to base section 602. In embodiments, cover section 604 includes a profile for receiving an investment casting core (not shown) thereon. The profile of cover section 604 may include an upper profile 610 that substantially mates with a portion of the investment casting core received thereon, for example, an undersurface of the investment casting core, and a lower profile that substantially mates with an upper profile of base section 602. In the embodiments, base section 602 may include a peripheral groove 634. The peripheral groove 634 is configured to be positioned between a central portion 636 of base section 602 and a lip 628 surrounding central portion 636. In certain embodiments, peripheral groove 634 is configured to receive a peripheral edge 638 of cover section 604 therein.

In FIG. 6B, a top perspective view of setter 600 is provided, showing cover section 604 received in base section 602, where a peripheral edge 638 of cover section 604 is received within peripheral groove 634 and abuts lip 628.

Figure 7A:
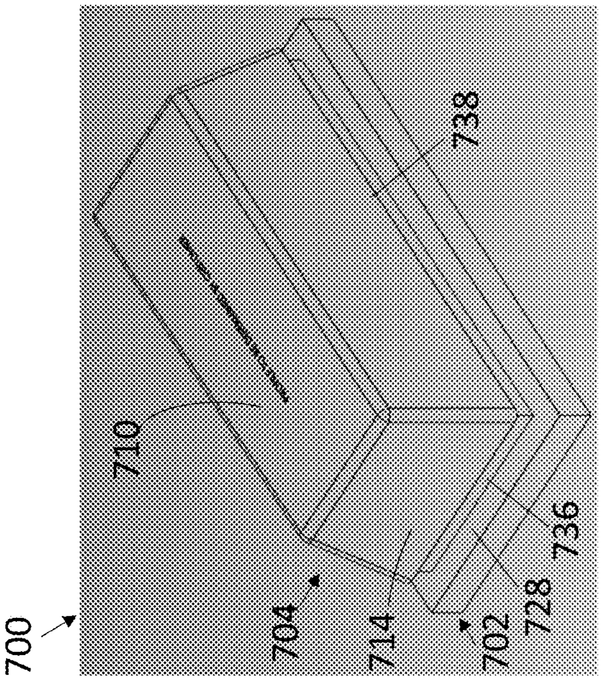
FIG. 7A is an exploded perspective view of a setter that includes a base section including a central portion and a lip surrounding the central portion, according to embodiments of the disclosure.

FIG. 7A is an exploded perspective view of a setter 700. Setter 700 includes a base section 702 and a cover section 704 configured to mechanically couple to base section 702. In embodiments, cover section 704 includes a profile for receiving an investment casting core (not shown) thereon. The profile of cover section 704 may include an upper profile 710 that substantially mates with a portion of the investment casting core received thereon, for example, an undersurface of the investment casting core, and a lower profile 714 that substantially mates with an upper profile of base section 702. In the embodiments, base section 702 may include a central portion 736 extending upwardly from a bottom surface of base section 702, and a lip 728 surrounding central portion 736. When the cover section 704 is received in base section 702, a peripheral inner surface of lower profile 714 of cover section 704 abuts a peripheral external surface of central portion 736.

Figure 7B:
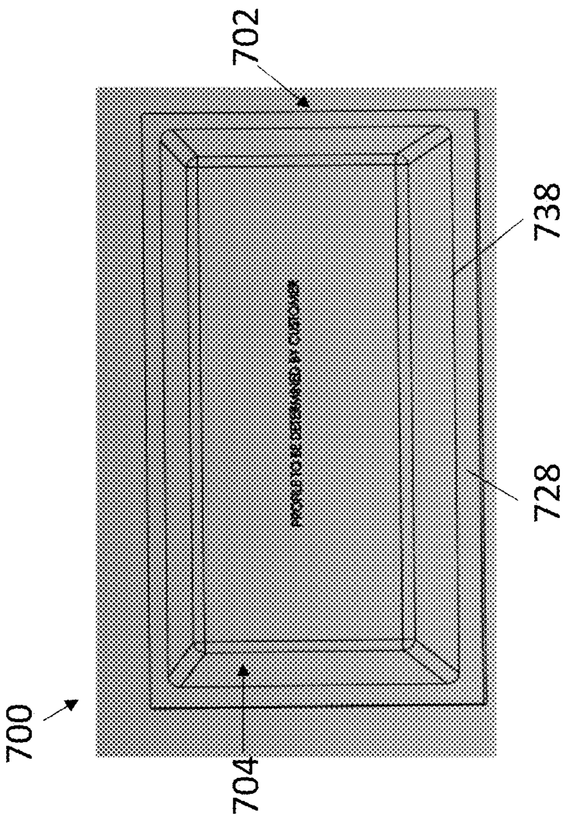
FIG. 7B is a top perspective view of the setter of FIG. 7A, according to embodiments of the disclosure.

In FIG. 7B, a top perspective view of setter 700 is provided, showing cover section 704 received in base section 702, where a peripheral edge 738 of cover section 704 is positioned on and abuts lip 728.

Figure 8B:
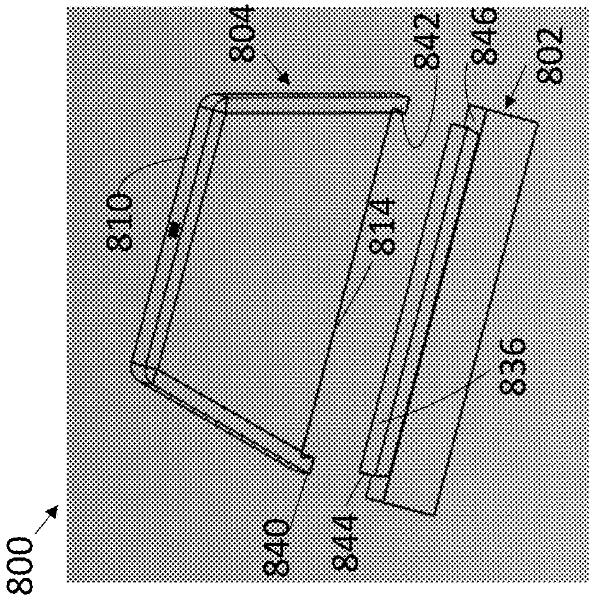
FIG. 8B is an exploded side view of the setter of FIG. 8A, according to embodiments of the disclosure.
Figure 8A:
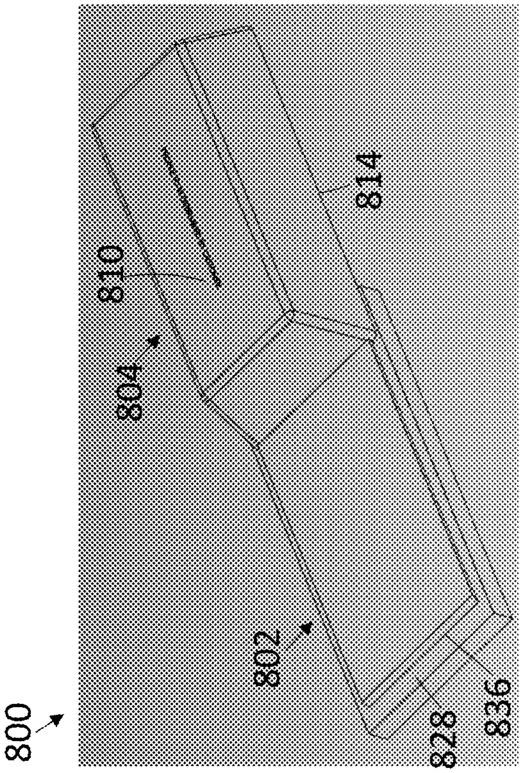
FIG. 8A is a perspective view of a setter that includes a base section including a dovetail edge, according to embodiments of the disclosure.

FIG. 8A is a perspective view of a setter 800. Setter 800 includes a base section 802 and a cover section 804 configured to mechanically couple to base section 802. In embodiments, cover section 804 includes a profile for receiving an investment casting core (not shown) thereon. The profile of cover section 804 may include an upper profile 810 that substantially mates with a portion of the investment casting core received thereon, for example, an undersurface of the investment casting core, and a lower profile 814 that substantially mates with an upper profile of base section 802. In embodiments, cover section 804 is configured to slidably engage base section 802.

With further reference to FIG. 8B, cover section 804 may include a first dovetail edge 840 and a second dovetail edge 842 opposite first dovetail edge 840. Base section 802 may include a central portion 836 extending upwardly from a bottom surface of base section 802 and includes a first side 844 and a second side 846 opposite to first side 844. In certain embodiments, each of the first and second sides 844, 846 outwardly projects towards and has a complimentary profile to a respective one of first and second dovetail edges 840, 842. In some embodiments, first and second sides 844, 846 each has a slanted surface angled to match an angle of a respective slanted inner surface of first and second sides 844, 846, such that first and second sides 844, 846 abut first and second dovetail edges 840, 842, respectively, when cover section 804 is received in base section 802. Such configuration mechanically couples cover section 804 to base section 802.

Figure 9B:
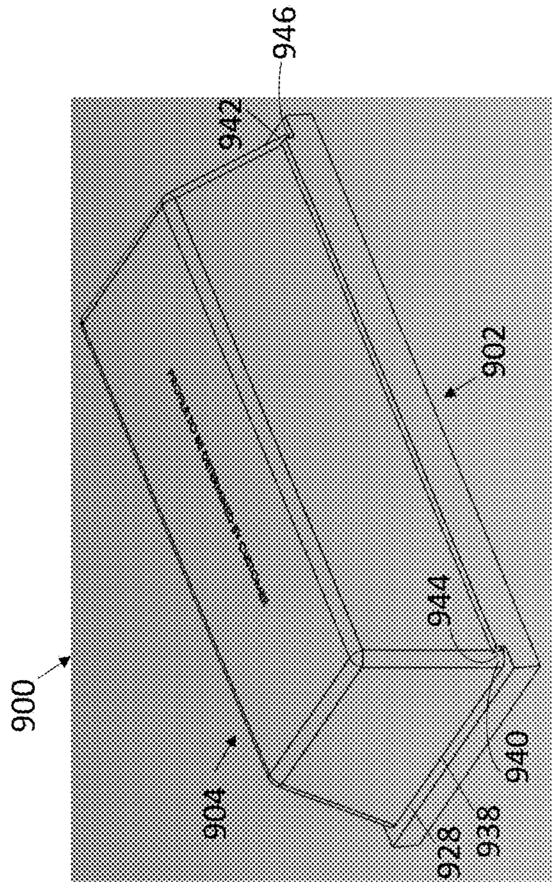
FIG. 9B is a perspective view of the setter of FIG. 9A, showing the cover section received in the base section, according to embodiments of the disclosure.
Figure 9A:
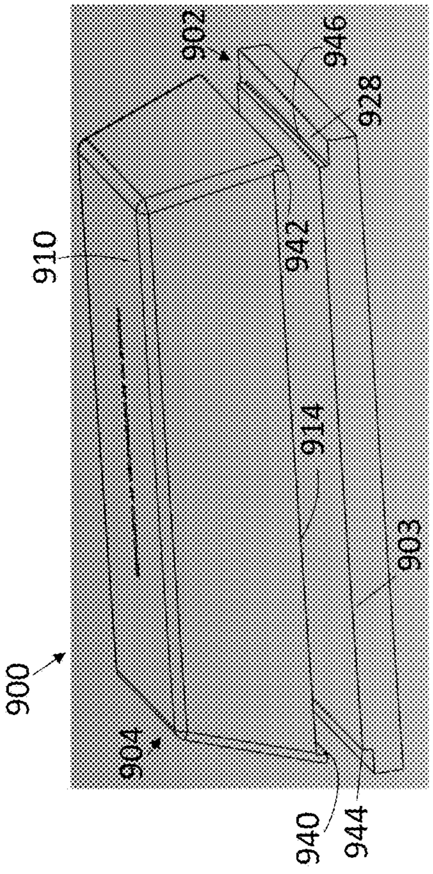
FIG. 9A is an exploded perspective view of a setter that includes a base section including a dovetail edge, according to embodiments of the disclosure.

FIG. 9A is a perspective view of a setter 900. Setter 900 includes a base section 902 and a cover section 904 configured to mechanically couple to base section 902. In embodiments, cover section 904 includes a profile for receiving an investment casting core (not shown) thereon. The profile of the cover section 904 may include an upper profile 910 that substantially mates with a portion of the investment casting core received thereon, for example, an undersurface of the investment casting core, and a lower profile 914 that substantially mates with an upper profile of base section 902. In embodiments, cover section 904 is configured to slidably engage base section 902.

With further reference to FIG. 9A, cover section 904 may include a first dovetail edge 940 and a second dovetail edge 942 opposite first dovetail edge 940. Base section 902 may include a central portion 903 extending outwardly from a bottom surface of base section 902 and a lip 928 surrounding central portion 903. The central portion 903 may include a first side 944 and a second side 946 opposite first side 944. In certain embodiments, each of the first and second sides 944, 946 outwardly projects towards and has a complimentary profile to a respective one of first and second dovetail edges 940, 942. In some embodiments, first and second sides 944, 946 each has a slanted surface angled to match a respective profile of first and second sides 944, 946, such that first and second sides 944, 946 abut first and second dovetail edges 940, 942, respectively, when cover section 904 is received in base section 902. Such configuration mechanically couples cover section 904 to base section 902.

In FIG. 9B, a top perspective view of setter 900 is provided, showing cover section 904 received in base section 902, where a peripheral edge 938 of cover section 904 is positioned on and abuts lip 928.

It is to be understood that the slidable engagement between the cover section and the base section of a setter as illustrated in the figures of the current disclosure is a non-limiting example. Other slidable engagement between the cover section and the base section of a setter may be used.

Figure 10B:
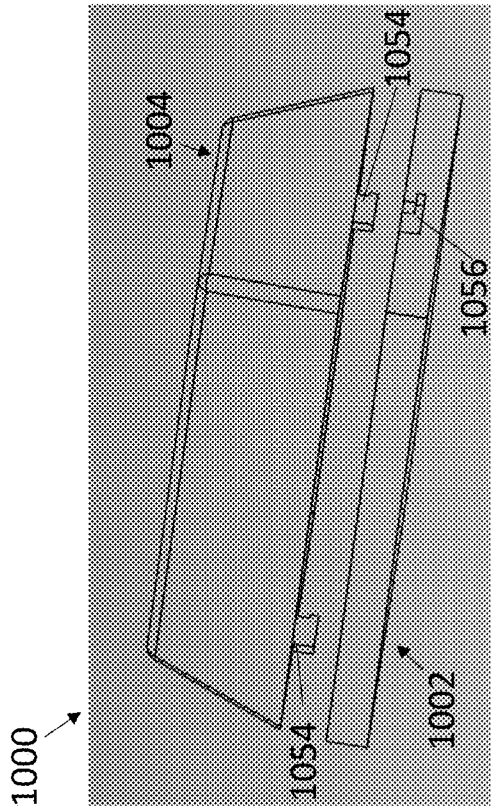
FIG. 10B is another exploded perspective view of the setter of FIG. 10A, according to embodiments of the disclosure.
Figure 10A:
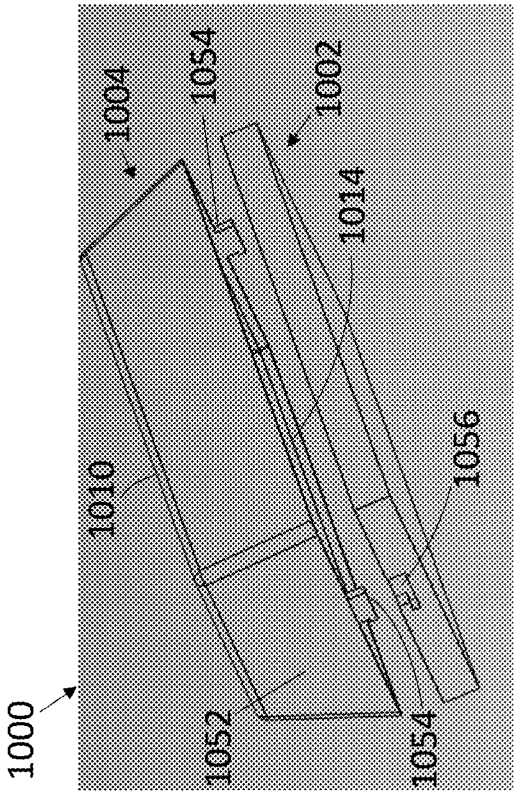
FIG. 10A is an exploded perspective view of a setter that includes: a cover section including a projection, and a base section including a projection-engagement structure, according to embodiments of the disclosure.

Turning to FIG. 10A, an exploded perspective view of a setter 1000 is provided. Setter 1000 includes a base section 1002 and a cover section 1004 configured to mechanically couple to base section 1002. In embodiments, cover section 1004 includes a profile for receiving an investment casting core (not shown) thereon. The profile of the cover section 1004 may include an upper profile 1010 that substantially mates with a portion, for example, an undersurface of the investment casting core received thereon, and a lower profile 1014 that substantially mates with an upper profile of base section 1002. In embodiments, cover section 1004 is configured to slidably lock base section 1002.

With further reference to FIGS. 10A and 10B, in embodiments, lower profile of cover section 1004 may include a sidewall 1052 and a projection 1054 extending outwardly from sidewall 1052 of cover section 1004 toward base section 1002. Base section 1002 may include a projection-engagement structure 1056 for receiving projection 1054 of cover section 1004 therein. In some embodiments, projection 1054 is configured to have a complimentary profile to that of projection-engagement structure 1056, such that projection-engagement structure 1056 receives and slidably locks projection 1054 therein. Such configuration mechanically couples cover section 1004 to base section 1002. In certain embodiments, both projection 1054 and projection-engagement structure 1056 have L-shapes.

Figure 10C:
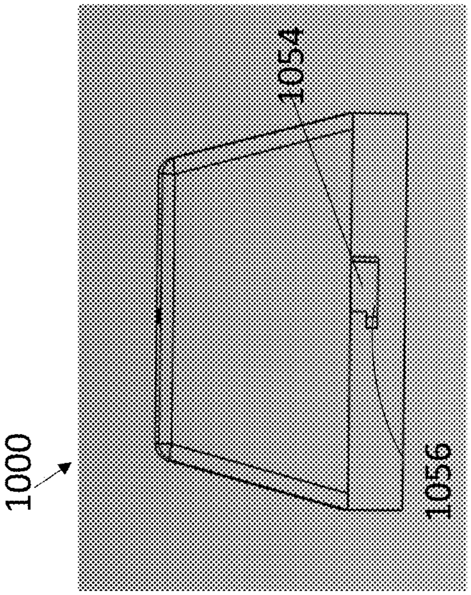
FIG. 10C is a perspective side view of the setter of FIG. 10A, according to embodiments of the disclosure.

In FIG. 10C, a side view of setter 1000 is provided, showing cover section 1004 received in base section 1002, where projection 1054 is fully received and positioned within projection-engagement structure 1056.

Figure 11B:
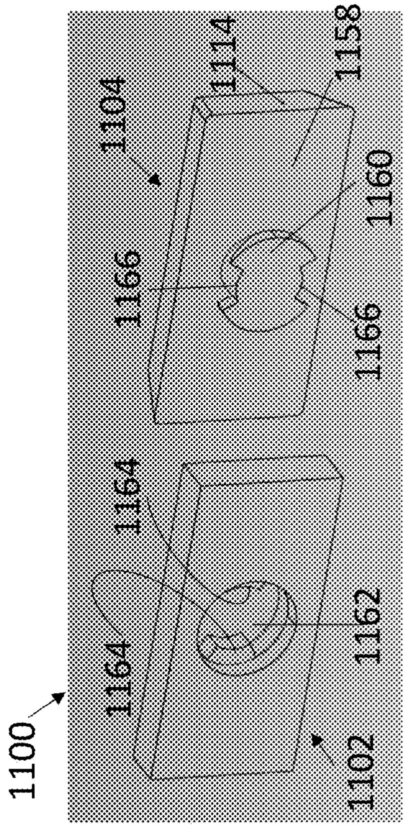
FIG. 11B is another exploded perspective view of the setter of FIG. 11A showing the base section and a cover section including a lock unit, according to embodiments of the disclosure.
Figure 11A:
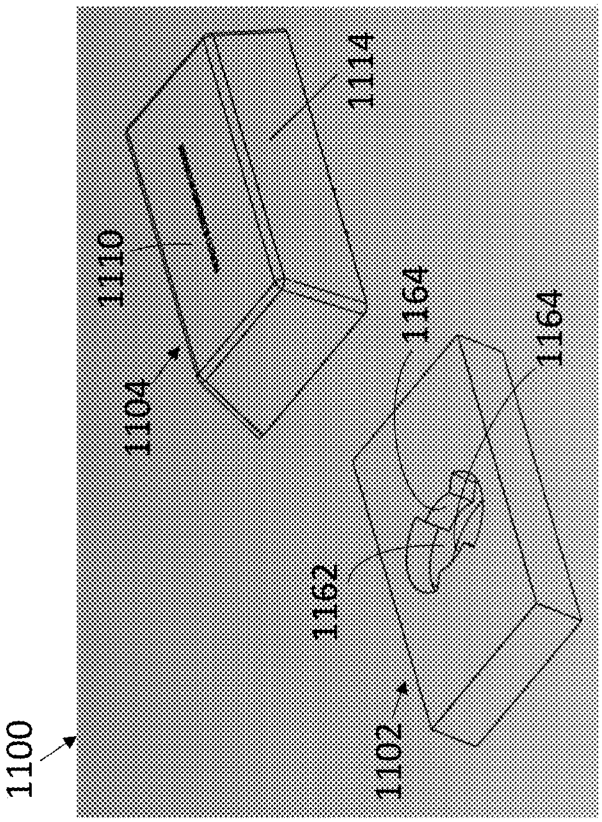
FIG. 11A is an exploded perspective view of a setter that includes a base section including a cutout portion, according to embodiments of the disclosure.

FIG. 11A provides an exploded perspective view of a setter 1100. Setter 1100 includes a base section 1102 and a cover section 1104 configured to mechanically couple to base section 1102. In embodiments, cover section 1104 includes a profile for receiving an investment casting core (not shown) thereon. The profile of the cover section 1104 may include an upper profile 1110 that substantially mates with a portion, for example, an undersurface of the investment casting core received thereon, and a lower profile 1114 that substantially mates with an upper profile of base section 1102. In embodiments, cover section 1104 is configured to rotatably lock base section 1102.

Figure 11D:
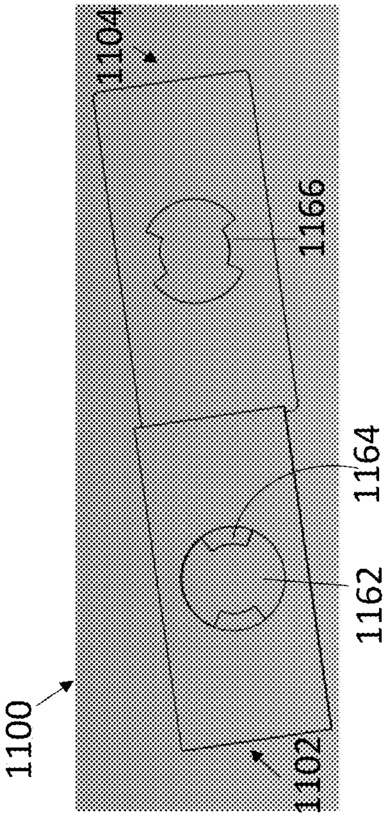
FIG. 11D is an exploded bottom perspective view of the setter of FIG. 11A, according to embodiments of the disclosure.
Figure 11C:
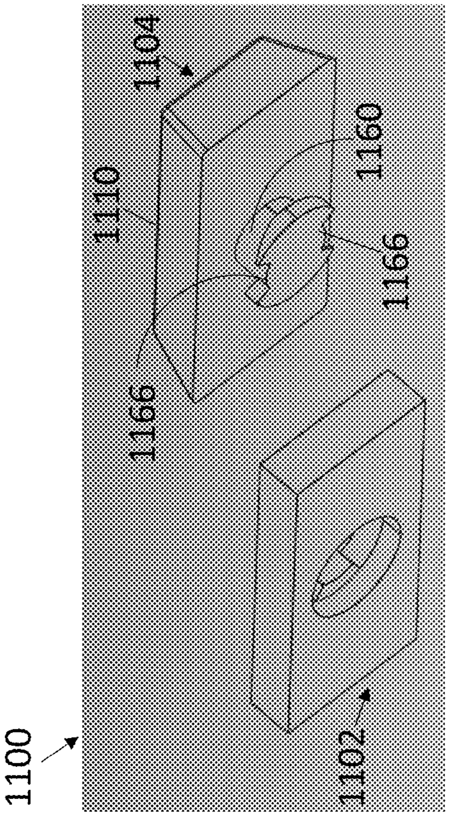
FIG. 11C is another exploded perspective view of the setter of FIG. 11A, according to embodiments of the disclosure.

With further reference to FIGS. 11B-11D, in embodiments, an underside 1158 of cover section 1104 includes a lock unit 1160. For example, underside 1158 of low profile 1114 of cover section 1104 includes lock unit 1160. The base section 1102 may include a cutout portion 1162 configured to receive lock unit 1160 and rotatably lock lock unit 1160 of cover section 1104 therein. The cutout portion 1162 may include a mechanical mating member that serves as a mechanical fastening feature that interlocks with corresponding mating features provided on lock unit 1160. In embodiments, cutout portion 1162 may include one or more tabs 1164 on the inner surface thereof. The lock unit 1160 may include one or more slots 1166 sized to permit one or more tabs 1164 to fit therein when cover section 1104 is received in and rotated relative to base section 1102 upon installation. In certain embodiments, cutout portion 1162 includes a plurality of tabs 1164 located on opposed portions of the inner surface of cutout portion 1162, and lock unit 1160 includes a plurality of slots 1166 formed in opposed locations on a sidewall of lock unit 1160, each of the plurality of slots 1166 sized to permit a respective one of the plurality of tabs 1164 to fit therein. In embodiments, cutout portion 1162 includes a through hole that extends between an upper surface and a lower surface of base section 1102, and one or more tabs 1164 are disposed on a peripheral inner surface of through hole.

Figure 12B:
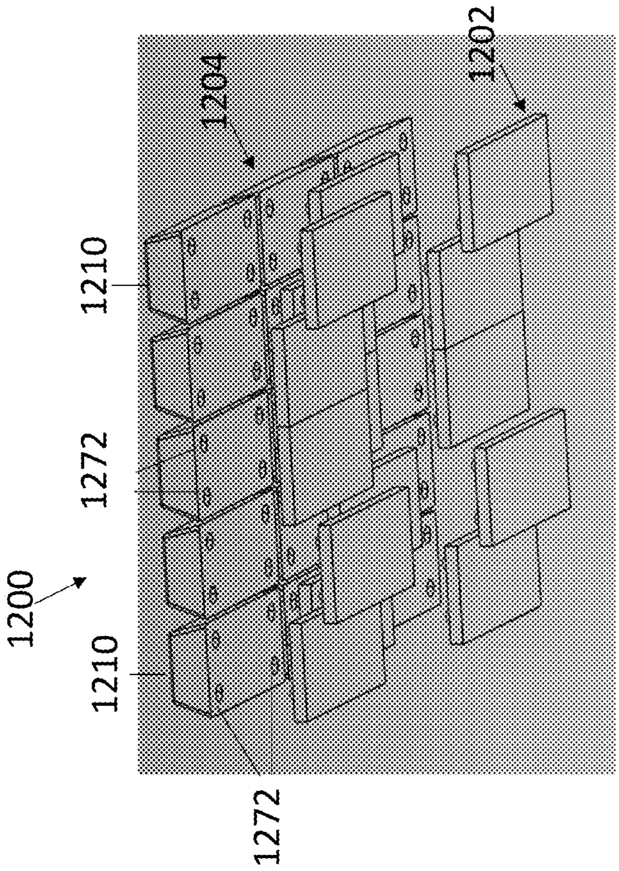
FIG. 12B is another exploded perspective view of the setter array of FIG. 12A, according to embodiments of the disclosure.
Figure 12A:
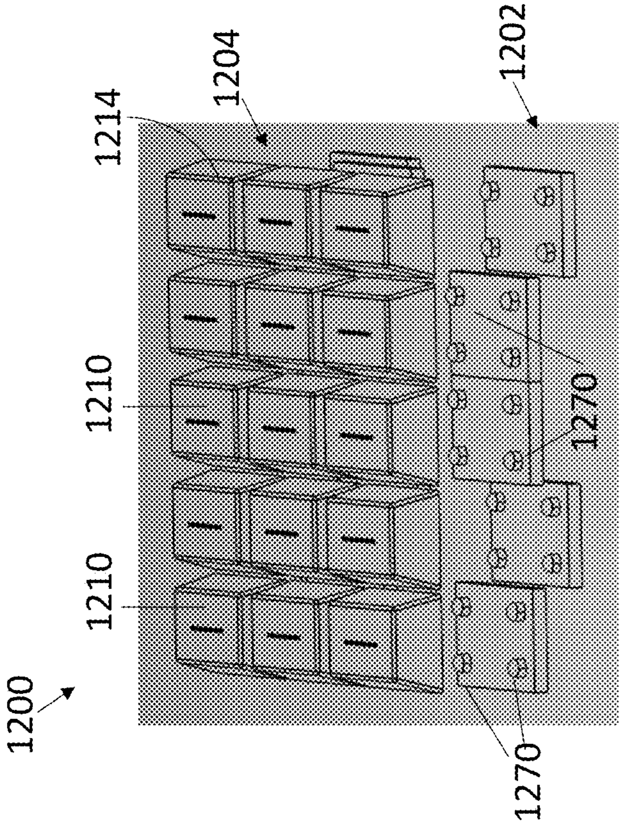
FIG. 12A is an exploded perspective view of a setter array including a base section and a plurality of cover sections, showing the matching profiles of the plurality of cover sections and corresponding portions of the base section, according to embodiments of the disclosure.

Turning to FIG. 12A, an exploded perspective view of a setter array 1200 for a plurality of investment casting cores is provided. Setter array 1200 includes a base section 1202 and a plurality of cover sections 1204 each configured to mechanically couple to a respective portion of base section 1202. In embodiments, each of the plurality of cover section 1204 includes a profile for receiving a respective one of the plurality of investment casting cores (not shown) thereon. The profile of each cover section 1204 may include an upper profile 1210 that substantially mates with a portion, for example, an undersurface of each respective investment casting core received thereon, and a lower profile 1214 that substantially mates with an upper profile of a respective portion of base section 1202. In embodiment, each of the plurality investment casting core may have a unique profile different from each other, and each upper profile 1210 may be individually customized to substantially mate with the corresponding profile of the undersurface of each of the plurality investment casting core received thereon.

In FIG. 12A, base section 1202 is represented as a plurality of individual base sections each configured to be mechanically coupled to a respective one of the plurality of cover sections. It is to be understood that the embodiment of FIG. 12A is a non-limiting example, and that other configurations of base section 1202 may be used. For example, base section 1202 may be provided as a single-section component, or be provided as a multi-section component, where each section of the multi-section component corresponds to one or more of the plurality of cover sections.

In some embodiments, base section 1202 and one or more of the plurality of cover section 1204 may include the same material. In certain embodiments, setter array 1200 is a hybrid setter including two materials different from each other. The base section 1202 may include a first material, and each of the plurality of cover sections 1204 may include a second material different from the first material. In embodiments, the second material is the same material as the material of a respective investment casting core disposed on the each respective one of the plurality of cover sections 1204. Matching the second material with the material of the investment casting core provides the benefits of minimizing any distortion that may occur during the heat treatment of the plurality of investment casting cores.

In embodiments, the first material may be a ceramic material including, but not limited to: cordierite, fireclay, ball clay, tile clay, flint clay, or any combinations thereof. The second material may be a ceramic material including, but not limited to: alumina, mullite, silica, or zirconia, or any combinations thereof. The second ceramic material may be different from the first ceramic material. The first and second materials may be selected such that setter array 1200 withstands a temperature range of 1500° F. to 2500° F. during heat treatment of investment casting cores disposed thereon.

In embodiments, the first material is configured to have a first porosity in a range of about 5-45 vol %, or in a range of about 10-40 vol %, or in a range of about 15-35 vol %, or in a range of about 10-35 vol %, or in a range of about 10-25 vol %, based on a total volume of base section 1202. The second material of each of the plurality of cover sections 1204 is configured to have a second porosity in a range of about 1-5 vol %, in a range of about 2-4 vol %, based on a total volume of each of the plurality of cover sections 1204. The first porosity and the second porosity may be measured by using a calibrated scale and following ASTM (American Society for Testing and Material) standards, for example, ASTM standard test methods for apparent porosity. The first porosity and second porosity are selected to provide additional thermal stability to setters or setter systems of the instant disclosure.

With further reference to FIGS. 12A and 12B, in embodiments, base section 1202 may include a plurality of projections 1270 extending outwardly from a bottom surface of base section 1202. Each of the plurality of cover section 1204 may include a projection-engagement structure 1272 for receiving a respective one of the plurality of projections 1270 of base section 1202 therein. The projection-engagement structure 1272 and the respective one of the plurality of projections 1270 have complimentary profiles. In embodiment, each projection-engagement structure 1272 is sized to fit and abut the corresponding one of the plurality of projections 1270. Such configuration mechanically couples each of the plurality of cover section cover section 1204 to a corresponding portion of base section 1202.

It is to be understood that setter array 1200 as illustrated herein is a non-limiting example. For example, configurations of each of setters 100-1100 as described in this disclosure, along with other currently known or later developed mechanically coupling mechanisms between cover sections and base sections of the current disclosures may be incorporated and are within the scope of the setters and setter arrays of the current disclosure.

In embodiments, each of the plurality of cover sections 1204 is configured to slidably lock a respective portion of base section 1202. In embodiments, each of the plurality of cover sections 1204 is configured to rotatably lock a respective portion of base section 1202.

Figure 12C:
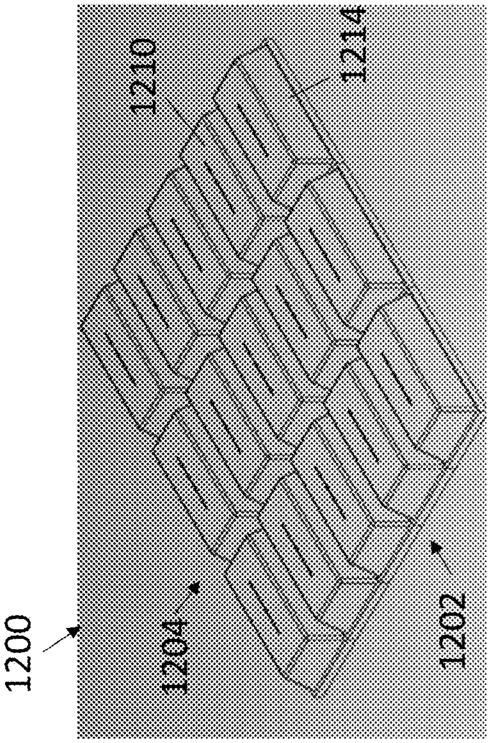
FIG. 12C is a perspective view of the setter array of FIG. 12A, showing the plurality of cover sections received in the base section, according to embodiments of the disclosure.

In FIG. 12C, a perspective view of setter array 1200 is provided, showing the plurality of cover section 1204 received in base section 1202, where each of the plurality of projections 1270 is fully received and positioned within corresponding one of the plurality of projection-engagement structures 1272.

Figure 13B:
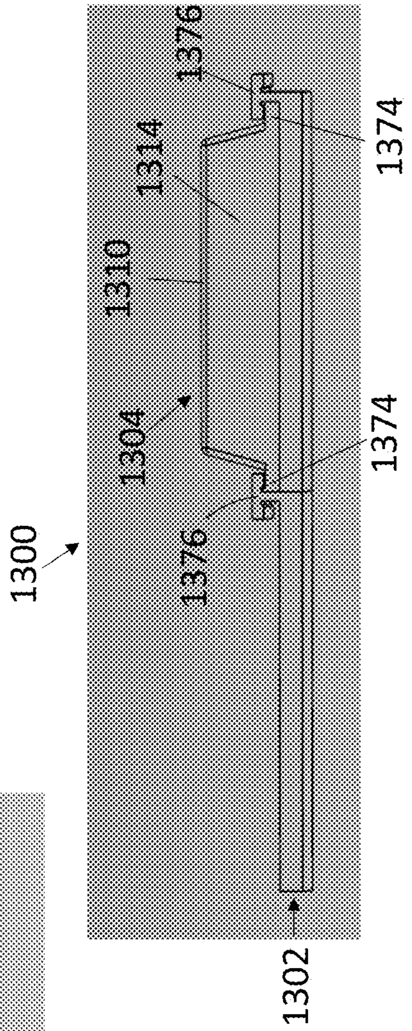
FIG. 13B is a perspective side view of the setter array of FIG. 13A, showing the plurality of cover sections received in the base section, according to embodiments of the disclosure.
Figure 13A:
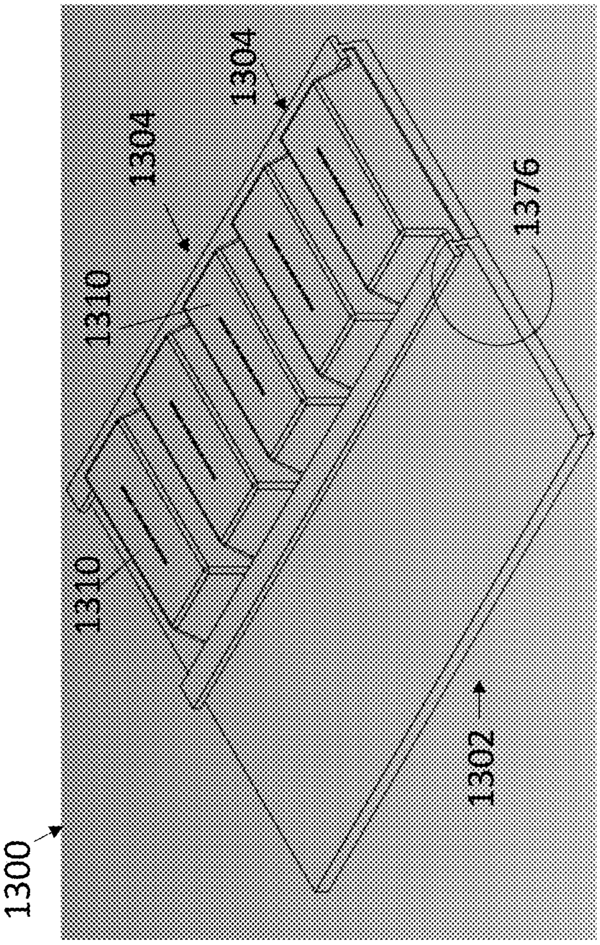
FIG. 13A is a perspective view of a setter array including a base section and a plurality of cover sections, according to embodiments of the disclosure.

FIG. 13A is a perspective view of a setter array 1300. Setter array 1300 includes a base section 1302 and a plurality of cover sections 1304 each configured to mechanically couple to a respective portion of base section 1302. In embodiments, each of the plurality of cover section 1304 includes a profile for receiving a respective one of the plurality of investment casting cores (not shown) thereon. The profile of each of the plurality of cover section 1304 may include an upper profile 1310 that substantially mates with a portion, for example, an undersurface of each respective investment casting core received thereon, and a lower profile 1314 that substantially mates with an upper profile of a respective portion of base section 1302.

In some embodiments, base section 1302 and one or more of the plurality of cover section 1304 may include the same material. In certain embodiments, setter array 1300 is a hybrid setter including two materials different from each other. The base section 1302 may include a first material, and each of the plurality of cover sections 1304 may include a second material different from the first material. In embodiments, the second material is the same material as the material of a respective investment casting core disposed on the each respective one of the plurality of cover sections 1304. Matching the second material with the material of the investment casting core provides the benefits of minimizing any distortion that may occur during the heat treatment of the plurality of investment casting cores.

In embodiments, the first material may be a ceramic material including, but not limited to: cordierite, fireclay, ball clay, tile clay, flint clay, or any combinations thereof. The second material may be a ceramic material including, but not limited to: alumina, mullite, silica, or zirconia, or any combinations thereof. The first and second materials may be selected such that setter array 1300 withstands a temperature range of 1500° F. to 2500° F. during heat treatment of investment casting cores disposed thereon.

In embodiments, the first material is configured to have a first porosity in a range of about 5-45 vol %, or in a range of about 10-40 vol %, or in a range of about 15-35 vol %, or in a range of about 10-35 vol %, or in a range of about 10-25 vol %, based on a total volume of base section 1302. The second material of each of the plurality of cover sections 1304 is configured to have a second porosity in a range of about 1-5 vol %, in a range of about 2-4 vol %, based on a total volume of each of the plurality of cover sections 1304. The first porosity and the second porosity may be measured by using a calibrated scale and following ASTM (American Society for Testing and Material) standards, for example, ASTM standard test methods for apparent porosity. The first porosity and second porosity are selected to provide additional thermal stability to setters or setter systems of the instant disclosure.

In FIG. 13B, a side view of setter array 1300 is provided, showing cover section 1304 received in base section 1302, where projection 1374 is fully received and positioned within projection-engagement structure.

With further reference to FIG. 13B, in certain embodiments, the projection-engagement structure may be a T-shaped slot 1376 positioned on a bottom surface of base section 1302 and extending along a longitudinal axis of base section 1302. Each of the plurality of cover sections 1304 may include a protrusion 1374 having an upper surface configured to abut a portion of an undersurface of T-shaped slot 1376. When the plurality of cover sections 1304 are received in base section 1302, protrusions 1374 are fully received and positioned within T-shaped slot 1376. Such configuration mechanically couples cover sections 1304 to base section 1302. It is to be understood that setter array 1300 as illustrated herein is a non-limiting example. For example, base section 1302 may be provided as a single-section component, or be provided as a multi-section component, where each section of the multi-section component corresponds to one or more of the plurality of cover sections. Furthermore, configurations of each of setters 100-1100 as described, along with other currently known or later developed mechanically coupling mechanisms between cover sections and base sections of the current disclosures may be incorporated in the setter array described herein and are within the scope of the current disclosure. For example, in embodiments where the base section includes a plurality of portions each of which corresponds to one or more of the plurality of cover sections, one or more of a respective portion of the base section may further include a central portion extending from the base section towards the cover section, and a lip surrounding the central portion.

Figure 14:
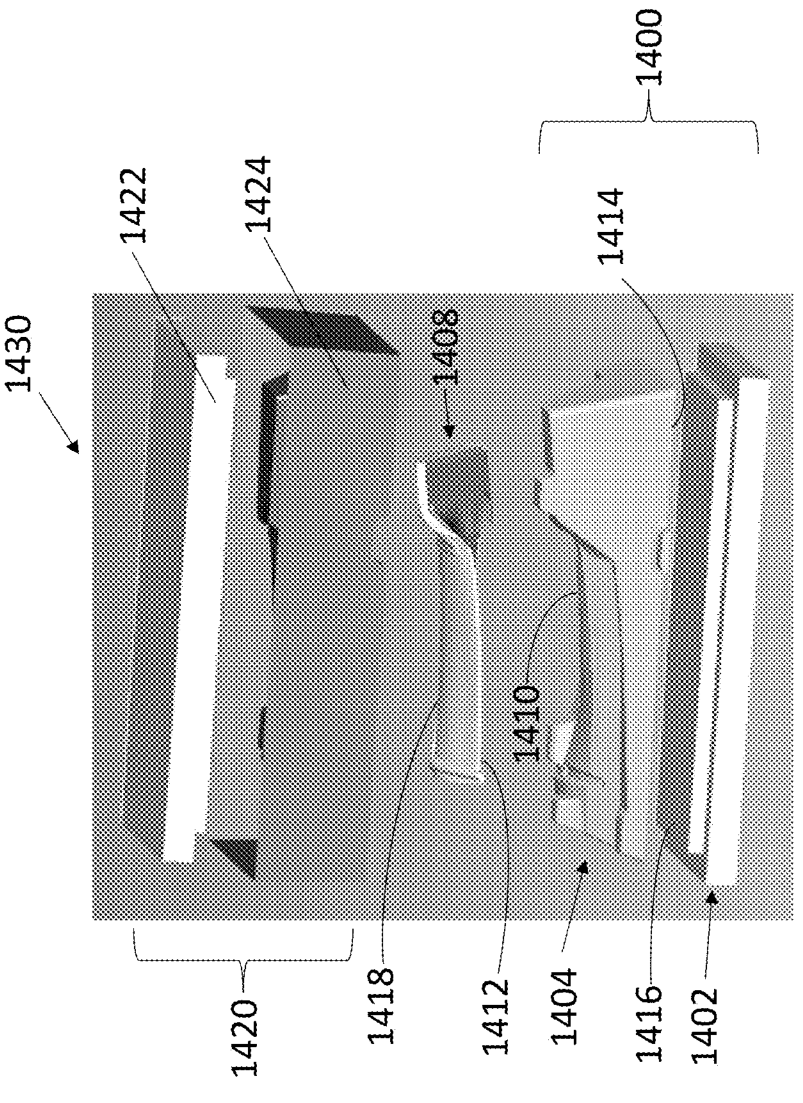
FIG. 14 is an exploded side view of a setter system including a first setter and a second setter with an investment casting core sandwiched between, according to embodiments of the disclosure.

In FIG. 14, an exploded side view of an alternative embodiment of a setter system with an investment casting core disposed therein is provided. The setter system includes a first setter 1400 and a second setter 1420, and an investment casting core 1408 is sandwiched between first setter 1400 and second setter 1420, according to embodiments of the disclosure. The first setter 1400 illustrated in FIG. 14 is similar to the setter 100 described in FIGS. 1A-1C and will not be described in detail here. However, it is to be understood that the first setter 1400 may include embodiments as described with respect to each of the setters 100-1100 and throughout the disclosure. In certain embodiments, the first setter 1400 includes a first cover section 1404 and a base section 1402. The profile of cover section 1404 may include an upper profile 1410 that substantially mates with a first portion, for example, an undersurface 1412 of investment casting core 1408 received thereon. In embodiments, the second setter 1420 includes a second cover section 1424 and a cap section 1422. The second cover section 1424 is configured to position over investment casting core 1408 and cap section 1422 is configured to couple to second cover section 1424. In embodiments, second cover section 1424 includes a profile for positioning second cover section 1424 over investment casting core 1408. The profile of second cover section 1424 may include a lower profile that substantially mates with a second portion of investment casting core 1408, for example, an upper surface 1418 of the investment casting core 1408. The profile of the second cover section 1424 may further include an upper profile that substantially mates with a lower profile of cap section 1422. It is to be understood that the embodiments and materials of the second setter 1420 and methods of making may be similar to the first setter 1400 and include, but are not limited to, the examples described throughout the disclosure.

Figure 15:
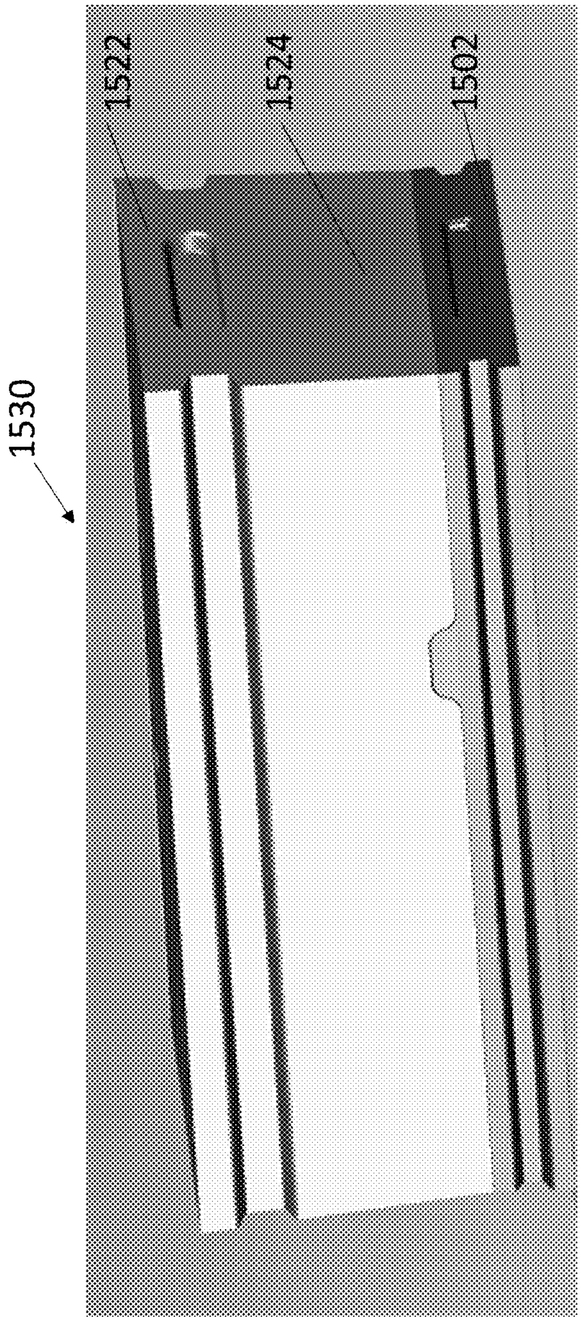
FIG. 15 is a perspective side view of a setter system including a first setter and a second setter with an investment casting core sandwiched between, according to embodiments of the disclosure.

As illustrated in FIG. 15, in an alternative embodiment of a setter system including a first setter 1500 and a second setter 1520 similar to what is described in embodiments of FIG. 14, when second setter 1520 is in place, second cover section 1524 may fully cover an investment casting core sandwiched between first setter 1500 and second setter 1520, and a cap section 1522 is coupled to second cover section 1524 according to embodiments of the disclosure.

Figure 16:
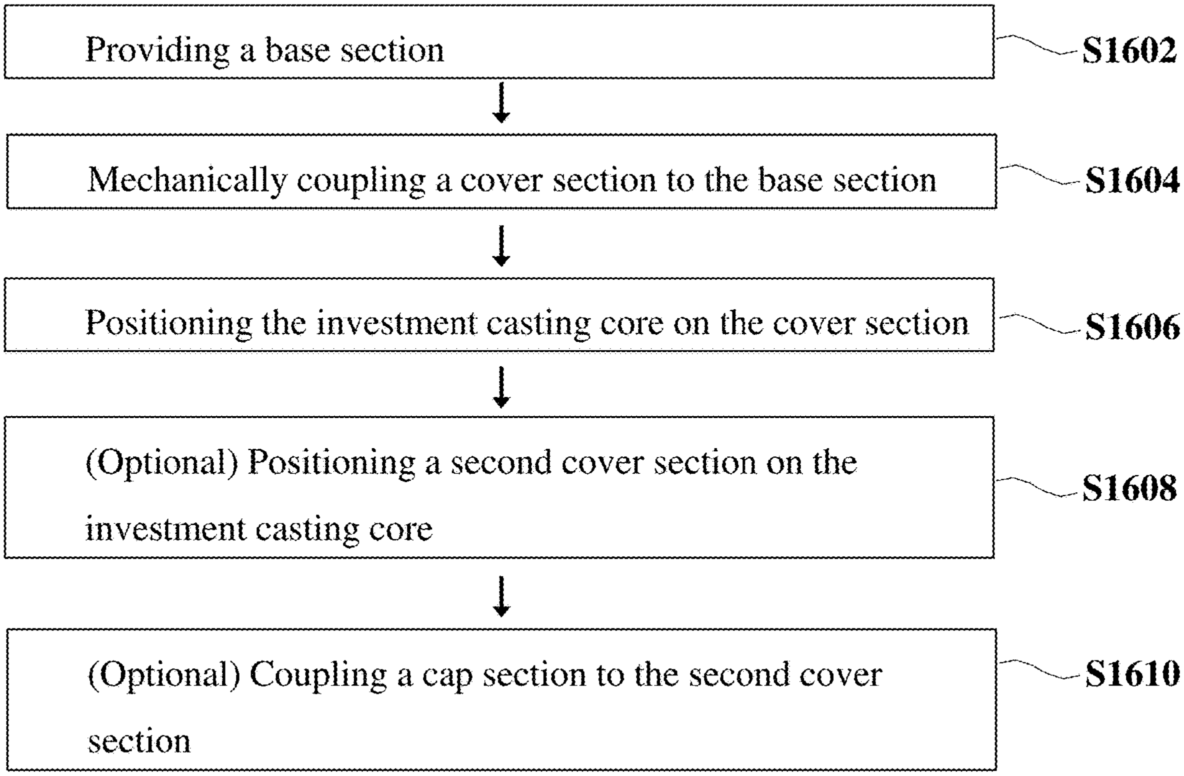
FIG. 16 is a flow diagram of a method for supporting an investment casting core using a setter, according to embodiments of the disclosure.

FIG. 16 is a flow diagram of a method for supporting an investment casting core during heat treatment using a setter of the current disclosure. The method may include: providing a base section 51602, mechanically coupling a cover section to the base section S1604, the cover section including a profile for receiving an investment casting core thereon, and positioning the investment casting core on the cover section 51606, such that an undersurface of the investment casting core substantially mates with a portion of the profile of the cover section that receives the investment casting core thereon. The method may optionally include the step S1608 of positioning a second cover section (e.g., second cover section 1424, FIG. 14) to the investment casting core. Additional optional steps (e.g., step S1610) may include mechanically coupling a cap section 1422 of a second setter 1420 to the second cover section 1424. In certain embodiments, one or both steps S1604 and S1610 may be performed without the use of a mortar. In embodiments, one or both steps S1604 and S1610 may include additional use of a mortar. The method may further include heat treating the investment casting core positioned on the setter. In embodiments, the method further includes heat treating the investment casting core positioned on the setter to a temperature range of 1500° F. to 2500° F.

Various non-limiting configurations of setters, setter systems, setter arrays, and investment casting cores as described in FIGS. 1-15 and throughout the instant disclosure may be used in the method. In embodiments, the investment casting core may be a ceramic core.

The base section and the cover section may be manufactured differently using various methods and materials. For example, a lower cost material and lower cost manufacturing method may be chosen in manufacturing the base section. The current disclosure provides embodiments where the base section's main function is to offer stability for the cover section and is not configured to be in direct contact with an investment casting core during the heat treatment. Therefore, the geometric and dimensional tolerance of the base sections are not as tightly controlled as the cover section, and different materials may be used for the base and the cover sections, allowing reduced lead times while meeting the design specification for the setter. Low cost materials for base section may include, but are not limited to, cordierite and clays (e.g. fireclay, ball clay, tile clay, flint clay), or any combinations thereof.

The manufacturing methods for the base section is dependent on the design of the setter. For example, for certain embodiments, a continuous process such as an extrusion process may be used. For embodiments with increasing complexity, methods that allow for incorporation of additional design complexities, such as a dry pressing process, may be used.

The cover section may be in direct contact with a customized investment casting core, thus having higher requirement for the tolerance (geometrical and dimensional including surface roughness) and material selection. In embodiments, the material for the cover section is the same as the material of the customized investment casting core. Typical materials for the cover section may include, but are not limited to, alumina, mullite, silica, and zirconia, or any combination thereof.

To manufacture the cover section and achieve the required tolerances with a highly complex design, an additive manufacturing method, for example, a stereolithography additive manufacturing method, may be used. The additive manufacturing methods provide complex designs with tight tolerances and low surface roughness.

In embodiments, the method may further include forming the base section having a first material, and forming the cover section having a second material different from the first material. The method may also include selecting the second material that is the same as a material of the investment casting core. In embodiments, the first material comprises a first ceramic material, and the second material comprises a second ceramic material different from the first ceramic material. The first and second materials may be selected such that setter array 1300 withstands a temperature range of 1500° F. to 2500° F. during heat treatment of investment casting cores disposed thereon.

In embodiments, the method may further includes controlling a first porosity of the first material to be in a range of about 5-45 vol %, or in a range of about 10-40 vol %, or in a range of about 15-35 vol %, or in a range of about 10-35 vol %, or in a range of about 10-25 vol %, based on a total volume of the base section. The method may additionally include controlling a second porosity of the second material to be in a range of about 1-5 vol %, in a range of about 2-4 vol %, based on a total volume of the cover sections. The first porosity and the second porosity may be measured by using a calibrated scale and following ASTM (American Society for Testing and Material) standards, for example, ASTM standard test methods for apparent porosity. It is to be understood that the methods disclosed in the current disclosure are non-limiting examples. Other currently known or later developed methods for manufacturing the cover section and the base section of the current disclosures may be used and are within the scope of the current disclosure.

The foregoing drawings show some of the processing associated according to several embodiments of this disclosure. In this regard, each drawing or block within a flow diagram of the drawings represents a process associated with embodiments of the method described. It should also be noted that in some alternative implementations, the acts noted in the drawings or blocks may occur out of the order noted in the figure or, for example, may in fact be executed substantially concurrently or in the reverse order, depending upon the act involved. Also, one of ordinary skill in the art will recognize that additional blocks that describe the processing may be added.

The methods of the current disclosure provide a hybrid setter where the base section and the cover section may include different materials and be manufactured in different processes, thereby meeting the demand of quickly providing a setter for customized investment casting cores, leading to reduced lead time and maintained geometrical tolerances of the setter.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise. "About," as applied to a particular value of a range, applies to both end values and, unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application and to enable others of ordinary skill in the art to understand the disclosure for various embodiments with various modifications as are suited to the particular use contemplated.

What is claimed is:

1. A setter system for an investment casting core, the setter system comprising:

a base section;

a first cover section configured to mechanically couple to the base section above the base section and having a customized upper profile to substantially mate with a first surface of the investment casting core thereon;

a cap section; and a second cover section configured to mechanically couple below the cap section and having a customized lower profile configured to substantially mate with a second surface of the investment casting core, wherein the first cover section and second cover section are configured to sandwich the investment casting core therebetween;

wherein the base section further includes a central portion extending upwardly from a bottom surface of the base section towards the first cover section, and includes a lip surrounding the central portion;

wherein the first cover section includes a first dovetail edge and a second dovetail edge opposite the first dovetail edge; and wherein the central portion includes a first side and a second side opposite to the first side, and wherein each of the first and second sides outwardly projects towards and has a complimentary profile to a respective one of the first dovetail edge and the second dovetail edge, respectively.

2. The setter of claim 1, wherein the base section includes a first material, and each cover section includes a second material different from the first material, and wherein each cover section is 3D printed.

3. The setter of claim 2, wherein the second material is the same as a material of the investment casting core.

4. The setter of claim 2, wherein the first material has a first porosity, and the second material has a second porosity, and wherein the first porosity is in a range of 5-45 vol % based on a total volume of the base section, and the second porosity is in a range of 1-5 vol % based on a total volume of the first cover section.

5. The setter of claim 2, wherein the first and second materials are selected such that the setter withstands a temperature range of 1500° F. to 2500° F. during heat treatment of the investment casting core.

6. The setter of claim 1, wherein the customized upper profile substantially mates with an undersurface of the investment casting core, and the customized lower profile substantially mates with an upper surface of the investment casting core.

7. The setter of claim 1 wherein the opposite sides of the central portion have a slanted surface angled to match the first dovetail edge and the second dovetail edge, respectively.

8. A setter array for a plurality of investment casting cores, the setter array comprising:

a base section;

a plurality of first cover sections each configured to mechanically couple to a respective portion of the base section and each having a customized upper profile to substantially mate with a lower surface of a respective one of the plurality of investment casting cores;

a cap section; and a plurality of second cover sections each configured to mechanically couple to a respective portion of the cap section and each having a customizer lower profile to substantially mate with an upper surface of a respective one of the plurality of investment casting cores and sandwich the respective one of the investment casting cores therebetween;

wherein the cap section is mortared to the plurality of second cover sections.

9. The setter array of claim 8, wherein the base section includes a first material, and one or more of the plurality of first cover sections include a second material different from the first material and wherein each first cover section is 3D printed.

10. The setter array of claim 9, wherein the second material is the same as a material of each respective one of the plurality of investment casting cores.

11. The setter array of claim 8, wherein each of the plurality of first cover sections includes a lower profile that substantially mates with a respective portion of an upper profile of the base section.

12. The setter array of claim 8, wherein the base section includes a T-shaped slot positioned on a bottom surface of the base section and extending along a longitudinal axis of the base section for mechanically coupling the plurality of cover sections.

13. The setter array of claim 12, wherein each of the plurality of cover sections includes a projection having an upper surface configured to abut a portion of a surface of the T-shaped slot.

14. A setter system for an investment casting core, the setter system comprising:

a base section;

a first cover section configured to mechanically couple to the base section above the base section and having a customized upper profile to substantially mate with a first surface of the investment casting core thereon;

a cap section; and a second cover section configured to mechanically couple below the cap section and having a customized lower profile configured to substantially mate with a second surface of the investment casting core, wherein the first cover section and second cover section are configured to sandwich the investment casting core therebetween;

wherein the cap section is mortared to the second cover section.

* * * * *